(12) United States Patent
Sip

(10) Patent No.: US 8,310,244 B2
(45) Date of Patent: Nov. 13, 2012

(54) POWER INTERRUPTION DETECTING SYSTEM, ELECTRONIC DEVICE AND POWER INTERRUPTION DETECTING DEVICE THEREOF

(75) Inventor: Kim-Yeung Sip, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 515 days.

(21) Appl. No.: 12/494,310

(22) Filed: Jun. 30, 2009

(65) Prior Publication Data
US 2010/0207636 A1 Aug. 19, 2010

(30) Foreign Application Priority Data
Feb. 18, 2009 (CN) .......................... 2009 1 0300459

(51) Int. Cl.
*G01R 31/02* (2006.01)
(52) U.S. Cl. ........................... 324/537; 714/24; 323/276
(58) Field of Classification Search .................. 324/537; 714/24; 323/276
See application file for complete search history.

(56) References Cited

U.S. PATENT DOCUMENTS

| 4,979,066 | A | * | 12/1990 | Kawata et al. | 361/18 |
|---|---|---|---|---|---|
| 5,835,780 | A | * | 11/1998 | Osaki et al. | 713/300 |
| 6,269,450 | B1 | * | 7/2001 | Iwata et al. | 713/340 |
| 7,307,820 | B2 | * | 12/2007 | Henson et al. | 361/42 |
| 7,363,542 | B2 | * | 4/2008 | Motegi | 714/24 |
| 2006/0227579 | A1 | * | 10/2006 | Glauser | 363/71 |
| 2007/0296390 | A1 | * | 12/2007 | Feigin et al. | 323/290 |

* cited by examiner

*Primary Examiner* — Arleen M Vazquez
(74) *Attorney, Agent, or Firm* — Altis Law Group, Inc.

(57) ABSTRACT

A power interruption detecting system includes an electronic device and a power interruption detecting device. The electronic device includes a power supply, a protection circuit, a main circuit and a recording structure. The power supply includes a first power supplying module and a second power supplying module. The protection circuit is connected in parallel to the first power supplying module. The main circuit is connected in parallel to the first power supplying module. The recording structure is connected to the main circuit and configured for collecting a number of values of working voltage of the main circuit. The power interruption detecting device is configured for determining a cause for a shutting down problem happened to the electronic device, according to the values of the working voltage.

16 Claims, 5 Drawing Sheets

POWER INTERRUPTION DETECTING SYSTEM, ELECTRONIC DEVICE AND POWER INTERRUPTION DETECTING DEVICE THEREOF

BACKGROUND

1. Technical Field

The present disclosure relates to detecting systems for electronic devices and, particularly, to a power interruption detecting system, an electronic device and a power interruption detecting device thereof.

2. Description of Related Art

Electronic devices, such as cell phones, sometimes stop working due to power supply interruption. However, due to complexity of the structure of a troubled electronic device, it is hard to identify and fix the fault in a timely fashion. Therefore, people often waste a lot of time trying to solve the problems.

Therefore, it is desirable to provide a power interruption detecting system, an electronic device and a power interruption detecting device thereof, which can overcome or at least alleviate the above-mentioned problems.

BRIEF DESCRIPTION OF THE DRAWINGS

Many aspects of the present power interruption detecting system, electronic device and power interruption detecting device should be better understood with reference to the following drawings. The components in the drawings are not necessarily drawn to scale, the emphasis instead being placed upon clearly illustrating the principles of the present power interruption detecting system, electronic device and power interruption detecting device. Moreover, in the drawings, like reference numerals designate corresponding parts throughout the several views.

DETAILED DESCRIPTION

Embodiments of the present power interruption detecting system, electronic device and power interruption detecting device will be now described in detail with reference to the drawings.

Figure 1:
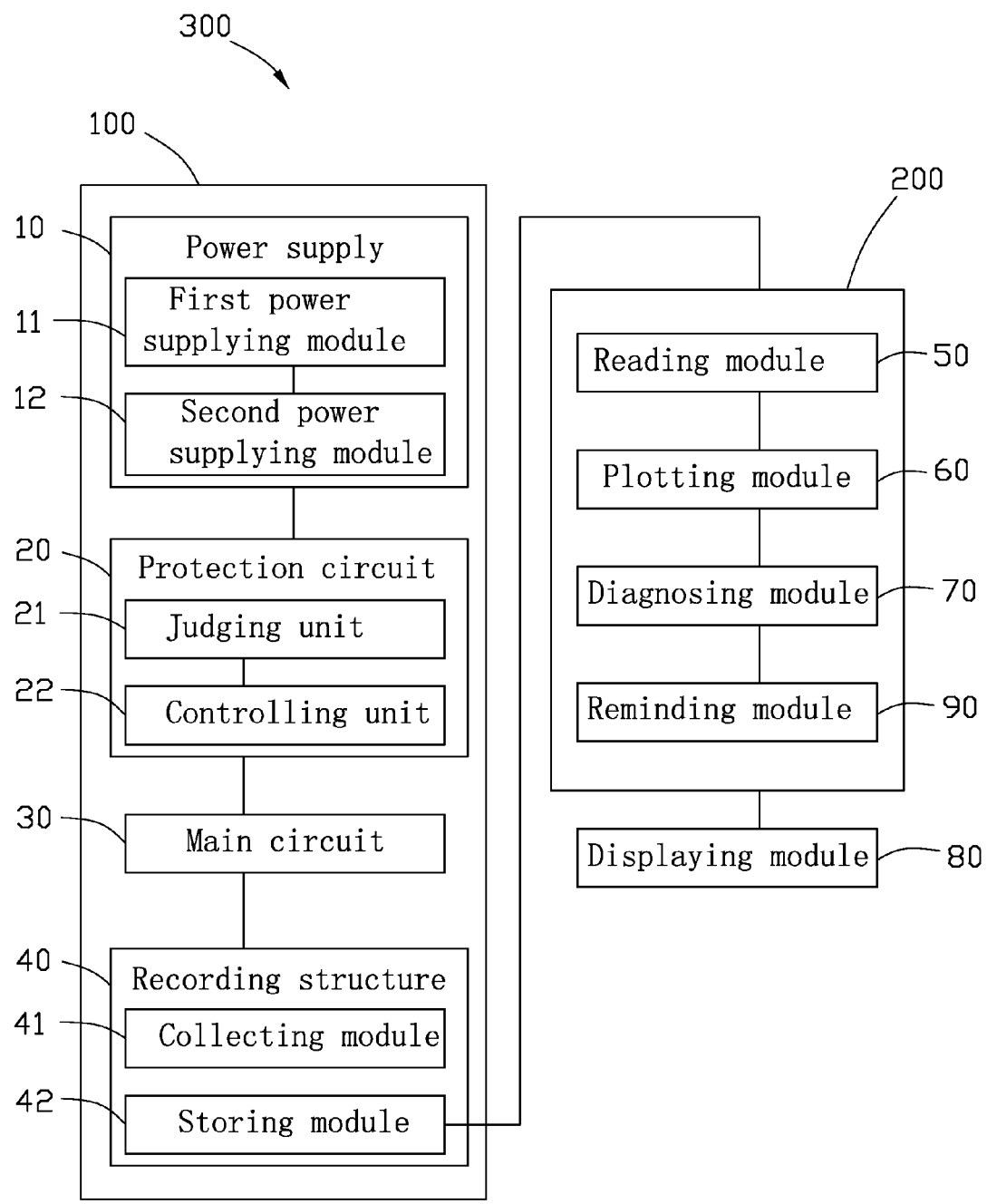
FIG. 1 is a functional block diagram of a power interruption detecting system including an electronic device and a power interruption detecting device, according to an exemplary embodiment.

Referring to FIG. 1, a power interruption detecting system 300 including an electronic device 100 and a power interruption detecting device 200, according to a present embodiment, is shown. The power interruption detecting device 200 can be integrated in the electronic device 100 or electrically coupled to the electronic device 100. The power interruption detecting device 200 is configured for detecting the cause for a shutting down problem happened to the electronic device 100.

Figure 2:
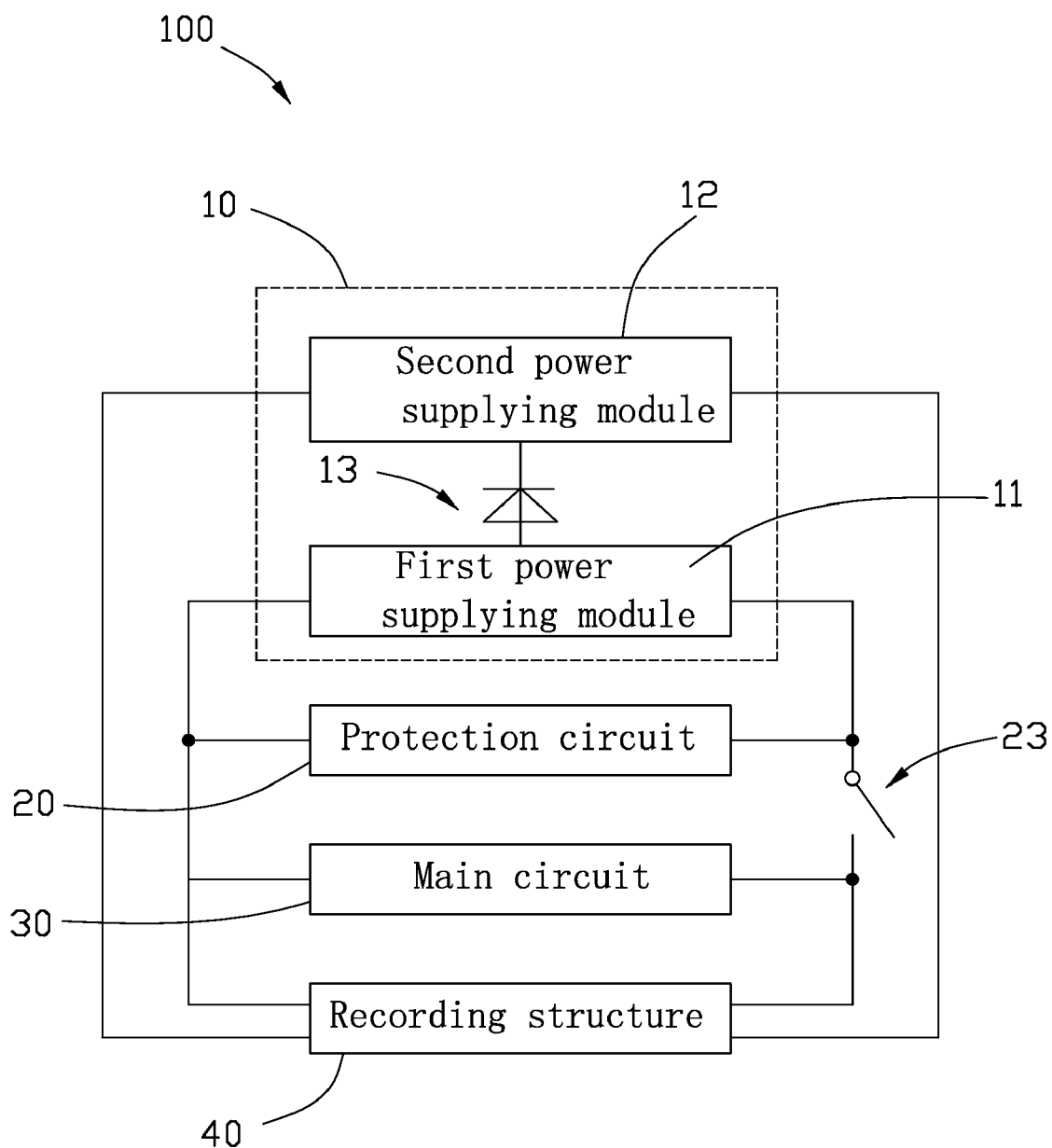
FIG. 2 is a circuit diagram of the electronic device of FIG. 1.

Referring to FIGS. 1-2, the electronic device 100 includes a power supply 10, a protection circuit 20, a main circuit 30 and a recording structure 40.

The power supply 10 includes a first power supplying module 11 configured for supplying electrical power to the main circuit 30, and a second power supplying module 12 configured for supplying electrical power to the recording structure 40 while the electrical connection between the first power supplying module 11 and the main circuit 30 is interrupted. In this embodiment, the first power supplying module 11 is connected to the second power supplying module 12 via a switched diode 13. The second power supplying module 12 is a capacitor. When the first power supplying module 11 is supplying electrical power to the main circuit 30, the switched diode 13 is in a forward bias condition. In this case, electrical power also can be provided to the second power supplying module 12 by the first power supplying module 11, and furthermore, the second power supplying module 12 can be charged by the first power supplying module 11. Therefore, when the first power supplying module 11 is interrupted to supply electrical power to the main circuit 30, the switched diode 13 is in reverse bias condition and the second power supplying module 12 can provide electrical power for the recording structure 40 in a preset time.

The protection circuit 20, the main circuit 30 and the recording structure 40 are connected to the first power supplying module 11 in parallel.

The protection circuit 20 includes a judging unit 21 and a controlling unit 22. The judging unit 21 defines a standard voltage U1 (shown in FIG. 3) capable of starting the main circuit 30. In this embodiment, the standard voltage U1 is 3.4V. The judging unit 21 judges whether a value of a working voltage U (shown in FIGS. 3-5) of the main circuit 30 is lower than the standard voltage U1. When the working voltage U is lower than the standard voltage U1, the controlling unit 22 will control the first power supplying module 11 to be interrupted to the main circuit 30. When the working voltage U is larger than the standard voltage U1 or equal to the standard voltage U1, the first power supplying module 11 maintains supplying electrical power to the main circuit 30. In this embodiment, the protection circuit 20 connects to the main circuit 30 via a protection switch 23. The protection switch 23 is controlled by the controlling unit 22, and is configured for switching the connection state of the first power supplying module 11 and the main circuit 30.

The main circuit 30 includes a number of built-in chips (not shown) with different functions. The first power supplying module 11 can provide electrical power to the built-in chips. Furthermore, there is a resistance-capacitance (R-C) delay circuit (not shown) connecting to the main circuit 30 to create a safe buffer time for the electrical device 100 to save data. When the first power supplying module 11 discontinues supplying power to the main circuit 30, the R-C delay circuit supplies the main circuit 30 with electrical power that decreases slowly. When the first power supplying module 11 is connected to the main circuit 30, the electrical power to the main circuit 30 increases slowly due to the R-C delay circuit.

The recording structure 40 includes a collecting module 41 and a storing module 42. The collecting module 41 is configured for collecting a number of values of the working voltage U of the main circuit 30 when the main circuit 30 is supplied with electrical power by the first power supplying module 11. The storing module 42 stores the values of the working voltage U transmitted from the collecting module 41. In this embodiment, the collecting module 41 collects at least three different values of the working voltage U. The storing module 42 is a non-volatile memory. In addition, the recording structure 40 is connected to the second power supplying module 12 in parallel. When the first power supplying module 11 is interrupted to the main circuit 30, the electrical power of the recording structure 40 is provided by the second power supplying module 12.

The power interruption detecting device 200 includes a reading module 50, a plotting module 60 and a diagnosing module 70. The reading module 50 is configured for reading the values of the working voltage U stored in the storing module 42. The plotting module 60 is configured for drawing a curve of a change of the values of the working voltage U according to the values of the working voltage U and the working time. The diagnosing module 70 is configured for determining the cause of the shutting down of the electronic device 100 according to the curve drawn by the plotting module 60. For instance, the diagnosing module 70 determines that the hardware of the electronic device 100 experiences a short circuit (e.g. in the main circuit 30) when the curve has a fluctuation, and determines a software problem when the curve is approximately a straight line.

Figure 3:
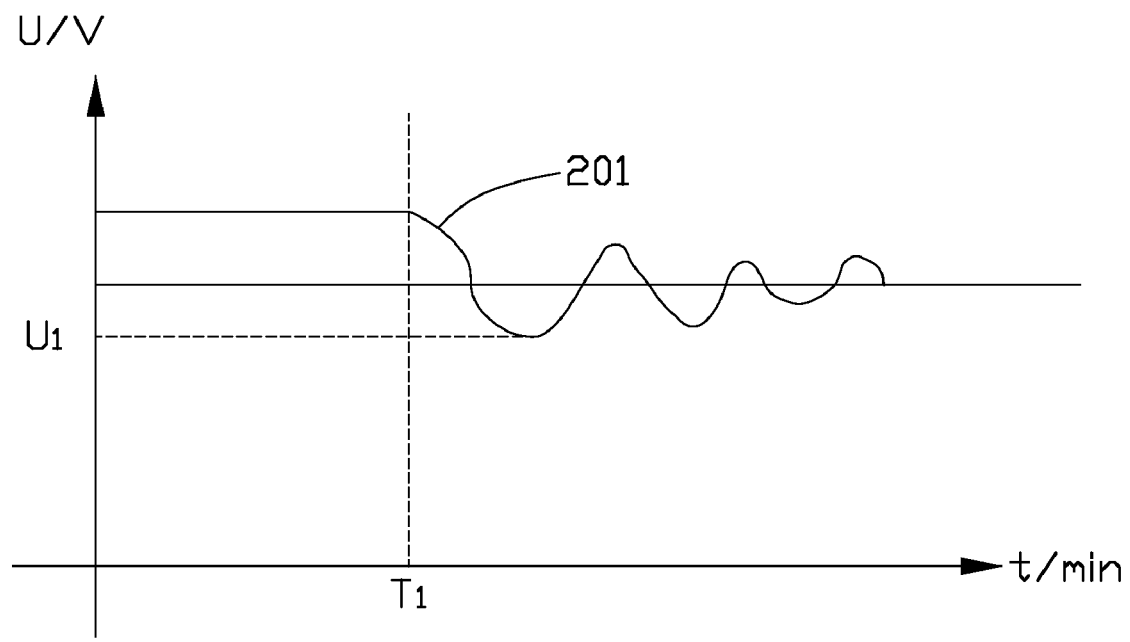
FIG. 3 is a curve drawn by the power interruption detecting device of FIG. 1, showing a first interruption problem of the electronic device of FIG. 1.

Referring to FIG. 3, a first curve 201 drawn by the plotting module 60 is shown. In this embodiment, the horizontal axis and the vertical axis represent working time t (min) and working voltage U (V), respectively. The trace of the first curve 201 shows that the working voltage U suddenly decreases at T1 and then goes up and down repeatedly. This fluctuation happens when the main circuit 30 is short circuited, thus the current of the electronic device 100 becomes too high, and, as a result, because of hardware problems, the values of the working voltage U drop down. Once the working voltage U drops down to the standard voltage U1 of the protection circuit 20, the protection switch 23 will disconnect to the first power supplying module 11 and results in electrical power interruptions to the main circuit 30. At this phase, the second power supplying module 12 provides electrical power to the main circuit 30 so that the working voltage U of the main circuit 30 rises again. Once the working voltage U becomes higher than the standard voltage U1, the protection switch 23 will connect the first power supplying module 11 to the main circuit 30 again. Once the first power supplying module 11 resumes providing electrical power to the main circuit 30, the main circuit 30 which has problem before, begins to draw too much power due to the short circuit. Then the working voltage U drops down again. This will happen repeatedly and lead the working voltage trace shown in FIG. 3 to go up and down. In this embodiment, the R-C delay circuit makes the trace smooth.

Figure 4:
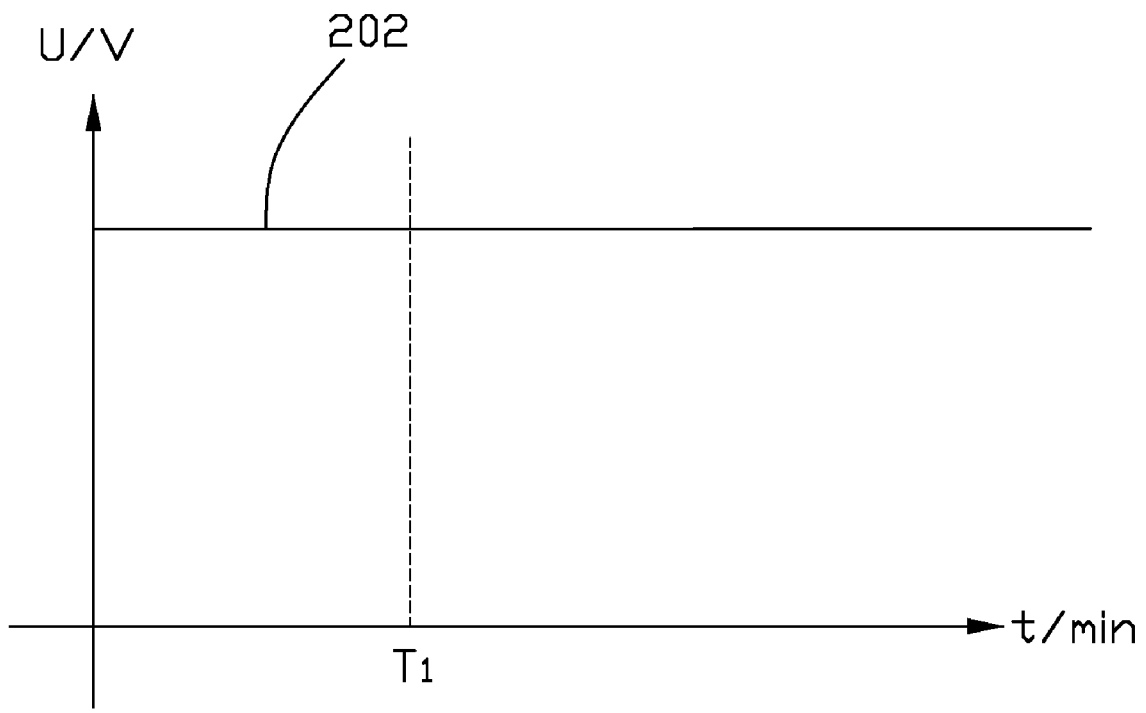
FIG. 4 is similar to FIG. 3, but showing a second interruption problem of the electronic device of FIG. 1.

Referring to FIG. 4, a second curve 202 is drawn by the plotting module 60. The horizontal axis and the vertical axis are similar to FIG. 3. The trace of the second curve 202 shows that the working voltage U is maintained not lower than the standard voltage U1, after the electronic device 100 shuts down at T1. It indicates that the first power supplying module 11 can supply electrical power to the main circuit 30 and the protection circuit 20 is closed. The current of the electronic device 100 is in a normal state. Therefore, according to this, it can judge that there is no short circuit in the hardware, but the software of the electronic device 100 may have erred.

Figure 5:
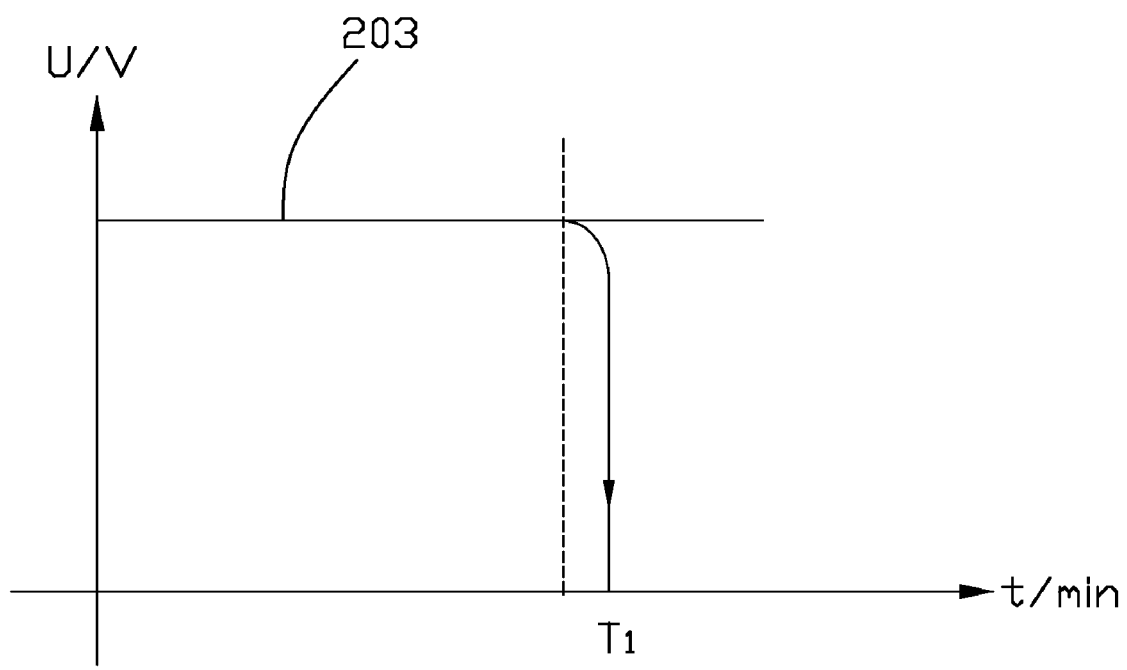
FIG. 5 is similar to FIG. 3, but showing a third interruption problem of the electronic device of FIG. 1.

Referring to FIG. 5, a third curve 203 is drawn by the plotting module 60. The horizontal axis and the vertical axis are similar to FIG. 3 or FIG. 4. The trace of the third curve 203 shows that the working voltage U of the main circuit 30 suddenly decreases to 0 V (volt) when the electronic device 100 shuts down at T1 and then remains at 0 V. That is to say, the first power supplying module 11 cannot supply electrical power to the main circuit 30 from T1. It indicates that it is a contact problem causing the electronic device 100 to shut down.

Furthermore, referring back to FIG. 1, the power interruption detecting device 200 includes a displaying module 80. The displaying module 80 displays the curve drawn by the plotting module 60. It is convenient to view the curve.

In this embodiment, the power interruption detecting device 200 can further include a reminding module 90 configured for outputting an alert according to the determined results in the diagnosing module 70 using visual text or audible sound.

In the present embodiment, since the curve can indicate the cause the electronic device 100 shuts down, the curve can be used in fixing the electronic device 100. As a result, time is saved on troubleshooting both hardware and software to identify the cause of the shut down.

It will be understood that the above particular embodiments and methods are shown and described by way of illustration only. The principles and the features of the present invention may be employed in various and numerous embodiments thereof without departing from the scope of the invention as claimed. The above-described embodiments illustrate the scope of the invention but do not restrict the scope of the invention.

What is claimed is:

1. A power interruption detecting system comprising:
    an electronic device comprising:
        a power supply comprising a first power supplying module and a second power supplying module;
        a protection circuit connected to the first power supplying module in parallel;
        a main circuit connected to the first power supplying module in parallel and receiving electrical power from the first power supplying module; and
        a recording structure connected to the power supply in parallel and receiving electrical power from the second power supplying module while the electrical connection between the first power supplying module and the main circuit is interrupted, and to the main circuit for collecting a plurality of values of working voltage of the main circuit; and
    a power interruption detecting device for determining a cause for a shutting down problem happened to the electronic device, according to the change of values of the working voltage.

2. The power interruption detecting system as claimed in claim 1, wherein the first power supplying module connects to the second power supplying module via a switched diode.

3. The power interruption detecting system as claimed in claim 1, wherein the second power supplying module is a capacitor.

4. The power interruption detecting system as claimed in claim 1, wherein the protection circuit comprises:
    a judging unit configured for judging whether a value of a working voltage of the main circuit is lower than a preset standard voltage of the main circuit; and
    a controlling unit configured for controlling the first power supplying module to be interrupted to the main circuit when the working voltage is lower than the standard voltage, and maintaining supplying electrical power to the main circuit when the working voltage is not lower than the standard voltage.

5. The power interruption detecting system as claimed in claim 4, wherein the protection circuit connects to the main circuit via a protection switch, and the protection switch is controlled by the controlling unit and configured for switching the electrical connection between the first power supplying module and the main circuit.

6. The power interruption detecting system as claimed in claim 4, wherein the recording structure comprises:
   a collecting module collecting a plurality of values of the working voltage of the main circuit when the first power supplying module supplies electrical power to the main circuit; and
   a storing module storing the values of the working voltage.

7. The power interruption detecting system as claimed in claim 6, wherein the storing module is a non-volatile memory.

8. The power interruption detecting system as claimed in claim 6, wherein the power interruption detecting device comprises:
   a reading module configured for reading the values of the working voltage stored in the storing module;
   a plotting module configured for drawing a curve according to the values of the working voltage and the working time; and
   a diagnosing module configured for determining a cause of a shutting down problem happened to the electronic device according to the curve.

9. The power interruption detecting system as claimed in claim 8, wherein the diagnosing module determines that the hardware of the electronic device experiences a short circuit when the curve has a fluctuation, and determines a software problem when the curve is approximately a straight line.

10. The power interruption detecting system as claimed in claim 8, wherein the power interruption detecting device further comprises a displaying module configured for displaying the curve.

11. The power interruption detecting system as claimed in claim 8, wherein the power interruption detecting device further comprises a reminding module configured for outputting an alert according to the determined results in the diagnosing module.

12. An electronic device comprising:
   a power supply comprising a first power supplying module and a second power supplying module;
   a protection circuit connected to the first power supplying module in parallel;
   a main circuit connected to the first power supplying module in parallel and receiving electrical power from the first power supplying module; and
   a recording structure connected to the power supply in parallel and receiving electrical power from the second power supplying module while the electrical connection between the first power supplying module and the main circuit is interrupted, and to the main circuit for collecting a plurality of values of working voltage of the main circuit.

13. The electronic device as claimed in claim 12, wherein the first power supplying module connects to the second power supplying module via a switched diode.

14. The electronic device as claimed in claim 12, wherein the protection circuit comprises:
   a judging unit configured for judging whether the value of the working voltage of the main circuit is lower than a preset standard voltage of the main circuit; and
   a controlling unit configured for controlling the first power supplying module to be interrupted to the main circuit when the working voltage is lower than the standard voltage, and maintaining supplying electrical power to the main circuit when the working voltage is not lower than the standard voltage.

15. The electronic device as claimed in claim 14, wherein the protection circuit connects to the main circuit via a protection switch, the protection switch controlled by the controlling unit and configured for switching the electrical connection between the first power supplying module and the main circuit.

16. The electronic device as claimed in claim 12, wherein the recording structure comprises:
   a collecting module collecting a plurality of values of the working voltage of the main circuit when the first power supplying module supplies electrical power to the main circuit; and
   a storing module storing the values of the working voltages.

* * * * *